(12) United States Patent
Plucinski

(10) Patent No.: US 10,566,124 B2
(45) Date of Patent: Feb. 18, 2020

(54) METERING VALVE

(71) Applicant: Hamilton Sundstrand Corporation, Charlotte, NC (US)

(72) Inventor: Wojciech Plucinski, Wrzesnia (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 15/638,897

(22) Filed: Jun. 30, 2017

(65) Prior Publication Data

US 2018/0005743 A1  Jan. 4, 2018

(30) Foreign Application Priority Data

Jun. 30, 2016 (EP) .................. 16461532

(51) Int. Cl.
| | |
|---|---|
| F16K 31/06 | (2006.01) |
| H01F 7/18 | (2006.01) |
| F02D 41/20 | (2006.01) |
| F02C 7/232 | (2006.01) |
| F16K 3/24 | (2006.01) |
| F16K 37/00 | (2006.01) |
| G01D 5/241 | (2006.01) |
| F02C 9/26 | (2006.01) |

(52) U.S. Cl.
CPC ........... *H01F 7/1844* (2013.01); *F02C 7/232* (2013.01); *F02D 41/20* (2013.01); *F16K 3/246* (2013.01); *F16K 31/0668* (2013.01); *F16K 31/0675* (2013.01); *F16K 37/005* (2013.01); *F02C 9/263* (2013.01); *F02D 2041/2058* (2013.01); *F02D 2200/063* (2013.01); *F05D 2220/32* (2013.01); *F05D 2270/821* (2013.01);

*G01D 5/2417* (2013.01); *H01F 2007/185* (2013.01); *H01F 2007/1866* (2013.01)

(58) Field of Classification Search
CPC ............... F16K 31/0675; F16K 37/005; F16K 37/0041; G01D 5/2417
USPC ..................................................... 251/129.04
See application file for complete search history.

(56) References Cited

U.S. PATENT DOCUMENTS

| | | | |
|---|---|---|---|
| 4,251,762 A | 2/1981 | Williams | |
| 4,656,400 A * | 4/1987 | Pailthorp | ................. H01F 7/18 310/14 |
| 4,793,313 A | 12/1988 | Paganon | |
| 5,052,174 A | 10/1991 | Bak | |
| 5,270,900 A | 12/1993 | Alden et al. | |

(Continued)

OTHER PUBLICATIONS

European Search Report for application EP 16461532.0, dated Dec. 19, 2016, 8pgs.

*Primary Examiner* — Matthew W Jellett
(74) *Attorney, Agent, or Firm* — Cantor Colburn LLP

(57) ABSTRACT

A metering valve comprising a solenoid having: a coil mounted on a core; and an armature moveable axially with respect to the core and against a return bias in response to a current in the coil; a variable capacitor having a first plate mounted for movement with the armature and a second plate fixed with respect to the core. The metering valve comprises an electronic feedback loop which is used to adjust the current in the coil based on a feedback signal derived from of the capacitance of the variable capacitor. A reference capacitor may be provided having opposing third and fourth plates at a set separation. A valve body may house the solenoid, the variable capacitor and the reference capacitor.

7 Claims, 6 Drawing Sheets

(56) References Cited

U.S. PATENT DOCUMENTS

| | | | | |
|---|---|---|---|---|
| 5,730,165 A | * | 3/1998 | Philipp | E03C 1/057 137/1 |
| 5,787,915 A | * | 8/1998 | Byers | F15B 13/0442 137/1 |
| 6,057,692 A | | 5/2000 | Allmendinger et al. | |
| 6,496,348 B2 | * | 12/2002 | McIntosh | B81B 3/0086 361/115 |
| 7,503,342 B2 | * | 3/2009 | Piehl | F15B 13/044 137/554 |
| 8,973,612 B2 | * | 3/2015 | Sawaski | E03C 1/055 137/1 |
| 2007/0241298 A1 | * | 10/2007 | Herbert | F16K 7/16 251/129.04 |
| 2010/0108165 A1 | * | 5/2010 | Rodenbeck | E03C 1/057 137/801 |

* cited by examiner

METERING VALVE

FOREIGN PRIORITY

This application claims priority to European Patent Application No. 16461532.0 filed Jun. 30, 2016, the entire contents of which is incorporated herein by reference.

TECHNICAL FIELD

The present disclosure relates to valves which are controlled using movement of an armature with respect to a coil of a solenoid. It is particularly concerned with metering valves for fluids, for example, fuel metering valves.

BACKGROUND

It is known in the art to provide a valve for metering a fluid such as fuel using a solenoid arrangement, whereby supply of current to the coil of the solenoid causes an armature to move relative to the coil. This in turn may displace a spool which meters the flow of fuel.

An electromechanical fuel metering valve may be used for dispensing fuel to the combustion zone of an engine, e.g., a gas turbine engine of an aircraft. Valves such as these are one of the components of an aircraft fuel control system and can be integrated with injector nozzles which spray the fuel into the combustion zone.

A problem of the design of such direct drive metering valves is a loss in flow adjustability, due to non-linearity of the solenoid current-armature displacement characteristic as the armature moves along its stroke. This is particularly so when other factors like changes in temperature have to be accounted for. As a result, the small-sized solenoids, which need to generate sufficiently high forces against a return spring in the valve, have a range of linearity limited to few tenths of a millimetre.

It would therefore be beneficial to develop an improved metering valve with more precise metering and adjustability. It would also help if more of the armature stroke could be used during valve operation.

U.S. Pat. No. 4,793,313 discloses a fuel injection apparatus for internal combustion engines, which uses a transducer to detect the switching and movement time of a valve member of a valve. By measuring these timings, the apparatus can determine how much fuel has been injected based on the amount of time the valve has been open. The apparatus can thus ensure that an intended quantity of fuel is supplied to the injectors, taking into account the movement time and the time taken for the valve to switch to the open or closed positions.

U.S. Pat. No. 5,270,900 discloses a method similar to the above. The method involves supplying a voltage to the armature measuring the current flow and calculating from the current flow and the voltage supplied when the movement of the armature began. Using the timings, the apparatus will then stop supplying voltage to the circuit a predetermined time after the motion was deemed to have begun.

U.S. Pat. No. 4,251,762 discloses an apparatus for sensing the actual position of an armature in an electromagnetic driver such as a solenoid. The apparatus does so using an electromagnetic induction loop, i.e. using inductors, to sense the position of the armature. Further, this document mentions that other methods may be used for measurement, such as by attaching a capacitor plate to the armature, for example. This document then explains that such an arrangement would be disadvantageous for at least the reason that the capacitor plate adds a significant mass to the armature.

The above methods and systems provide some possibilities for measuring armature position and for controlling metering. However, further improvements are proposed in the present disclosure.

SUMMARY

Viewed from one aspect, the present disclosure provides a metering valve comprising a solenoid having a coil mounted on a core and an armature moveable axially with respect to the core and against a return bias in response to a current in the coil. The metering valve includes a variable capacitor having a first plate mounted for movement with the armature and a second plate fixed with respect to the core. It may further include an electronic feedback loop which is used to adjust the current in the coil based on a feedback signal derived from capacitance of the variable capacitor.

Adjusting the current may comprise limiting the current in the coil as a function of the position of the armature along its stroke, i.e., the electronic feedback loop is programmed to limit the current in the coil based on a feedback signal derived from the capacitance of the variable capacitor. Put another way, it is programmed to reduce a displacement of the armature in a direction against the return bias based on the feedback signal derived from the capacitance of the variable capacitor.

The metering valve may comprise a reference capacitor having third and fourth plates at a set separation.

The metering valve may comprise a valve body which houses the solenoid, the variable capacitor and the reference capacitor.

The metering valve may comprise a controller for controlling the current in the coil and the movement of the armature, the controller being responsive to the feedback signal to adjust the current in the coil.

The controller may be programmed with an algorithm for adjusting the current in the coil based on the feedback signal.

The controller may be programmed to limit the current in the coil based on the feedback signal to provide the metering valve with a pseudo-linear solenoid current-armature displacement characteristic.

The electronic feedback loop of the metering valve may be configured to: observe a difference in the capacitances of the variable and reference capacitors; and use the difference in capacitances to produce a feedback signal corresponding to a displacement of the armature.

The electronic feedback loop of the metering valve may be configured to: observe a ratio of the capacitances of the variable and reference capacitors; and use the ratio of capacitances to produce a feedback signal corresponding to a displacement of the armature.

The electronic feedback loop may be internal to the metering valve. In other words, the metering valve may be a stand-alone component having the feedback functionality.

The metering valve may further comprise: a fluid inlet; a fluid outlet; a fluid flow path from the fluid inlet to the fluid outlet comprising a metering slot; and a metering spool configured to meter the flow of fluid in the fluid flow path at the metering slot.

The metering valve may be for metering fuel.

A metering spool in the metering valve may be fixed for movement with the armature to meter the fluid. The metering valve may comprise a return spring biasing the armature and the metering spool towards a closed configuration.

The metering valve may be a single stage fuel metering valve for an injector for gas turbine engine. The metering valve may be a single stage fuel metering valve having electronic feedback internal to the metering valve.

Viewed from a second aspect, the present disclosure can be seen to provide a method for controlling an armature displacement in a metering valve. The method may comprise: providing a current in a coil of a solenoid to displace an armature axially with respect to a core against a return bias, observing a capacitance of a variable capacitor, the capacitance varying according to a displacement of the armature, returning a feedback signal via an electronic feedback loop derived from of the capacitance of the variable capacitor, and utilising the feedback signal to adjust the current flowing in the coil.

The feedback signal may be utilised to limit the current flowing in the coil.

The method may further comprise: observing a capacitance of a reference capacitor; and comparing the two capacitance values to determine a difference in the capacitances. Comparing the two capacitance values may comprise determining a ratio of the capacitances. Thus the feedback signal may be based on a ratio of the capacitances of the variable capacitor and a reference capacitor.

The feedback signal may be returned via an electronic feedback loop which is internal to the metering valve.

The valve may comprise a diagnostic system internal to the metering valve, configured to provide system diagnostics based on the measured capacitance.

The variable capacitor may be a differential variable capacitor.

The valve may be a fluid metering valve, further comprising a fluid inlet, a fluid outlet, a fluid flow path from the fluid inlet to the fluid outlet and a metering spool configured to meter fluid in the fluid flow path at the position of the metering slot. The metering spool may be fixed for movement with the armature. The method of controlling the movement of the armature may comprise controlling the movement of the metering spool to allow or prevent fluid to flow through the metering slot to the fluid outlet. The fluid may be fuel, e.g., for a gas turbine engine. The method may be a method of metering fuel.

The method may further comprise providing a restoring force via a return compression spring acting against a movement of the armature in a direction induced when current flows through the solenoid, such that when there is no current in the coil, the restoring force pushes the metering spool to fully block the fluid flow path at the metering slot. The restoring force may push the metering spool with a preload.

The feedback signal may be used to provide the metering valve with a pseudo-linear solenoid current-armature displacement characteristic.

The method for controlling an armature displacement may be applied to a single stage fuel metering valve.

The method may be performed for metering fuel in a fuel path of a fuel injector in a gas turbine engine.

Capacitances of the capacitors may also be modulated in a digital signal form. These digital signals can be transmitted outside of the valve body using an electronic device, thereby providing an external feedback loop.

The present disclosure, and in particular the arrangement of a variable capacitor with a reference capacitor that is used in conjunction with a feedback loop to control an armature, may also have application to valves and electromechanical devices more generally. Accordingly, other such valves and electromechanical devices having an armature movable axially within a core of a solenoid against a return bias, further comprising a variable capacitor having a first plate mounted for movement with the armature and a second plate fixed with respect to the core, and an electronic feedback loop which is used to adjust the current in the coil based on a feedback signal derived from of the capacitance of the variable capacitor, are envisaged within the present disclosure.

BRIEF DESCRIPTION OF DRAWINGS

Embodiments of the present disclosure will now be described in greater detail by way of example only and with reference to the accompanying drawings, in which.

DETAILED DESCRIPTION

Figure 3:
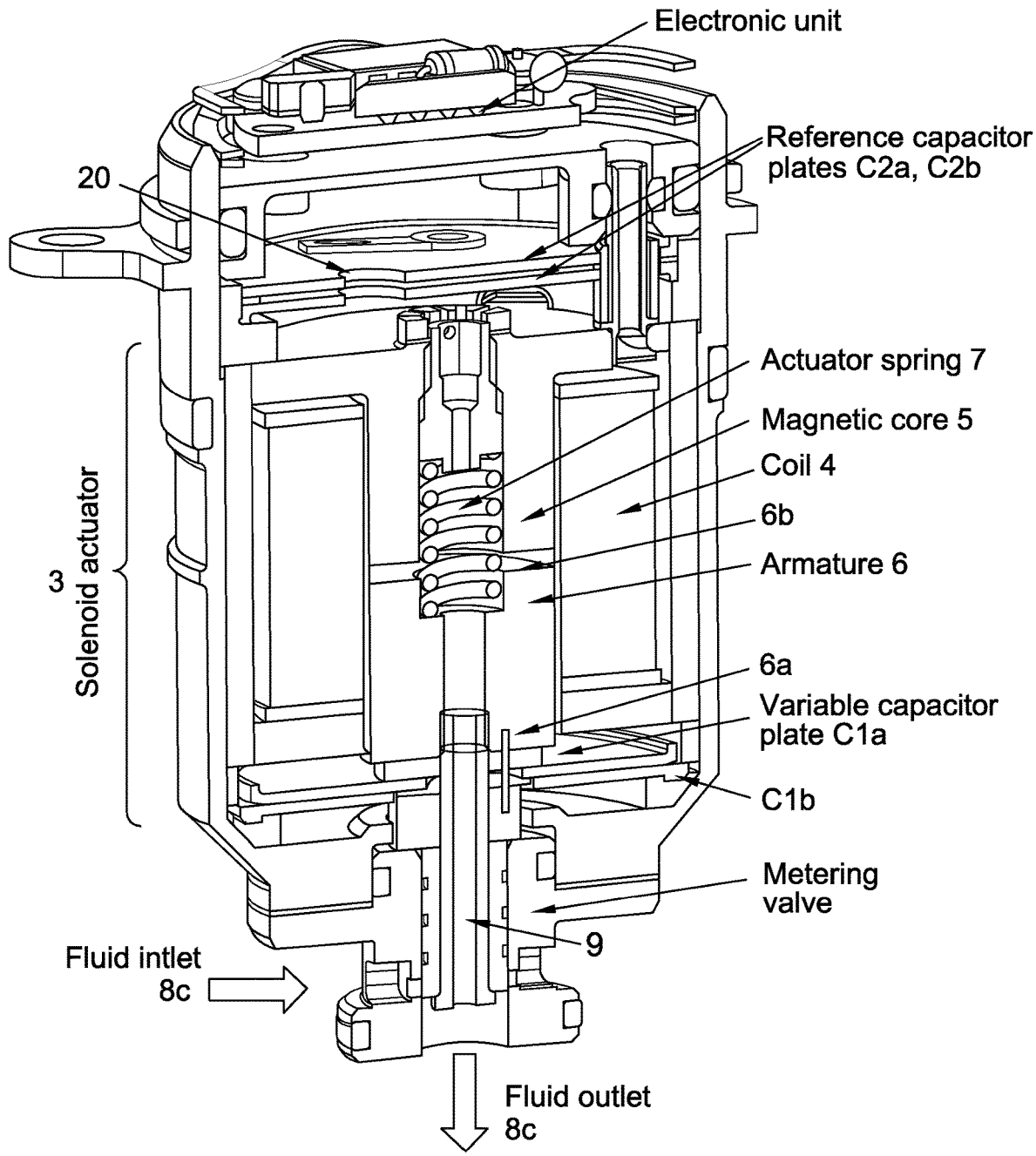
FIG. 3 illustrates an axial section through an exemplary valve according to a first embodiment of the present disclosure.

According to a first exemplary embodiment shown in FIG. 3, a valve 1 can comprise a valve body 2. The valve body 2 can house a solenoid 3 comprising a coil 4 wrapped around a core 5. An armature 6, for example, in the form of a cylindrical body, can be arranged so that a longitudinal direction of the armature 6, i.e. a direction in which the armature 6 is configured to move, is parallel to a longitudinal direction of the coil 4. The armature 6 is arranged to be displaced in a direction parallel to a longitudinal direction of the coil 4 when an electric current is provided in the coil 4.

Figure 4A:
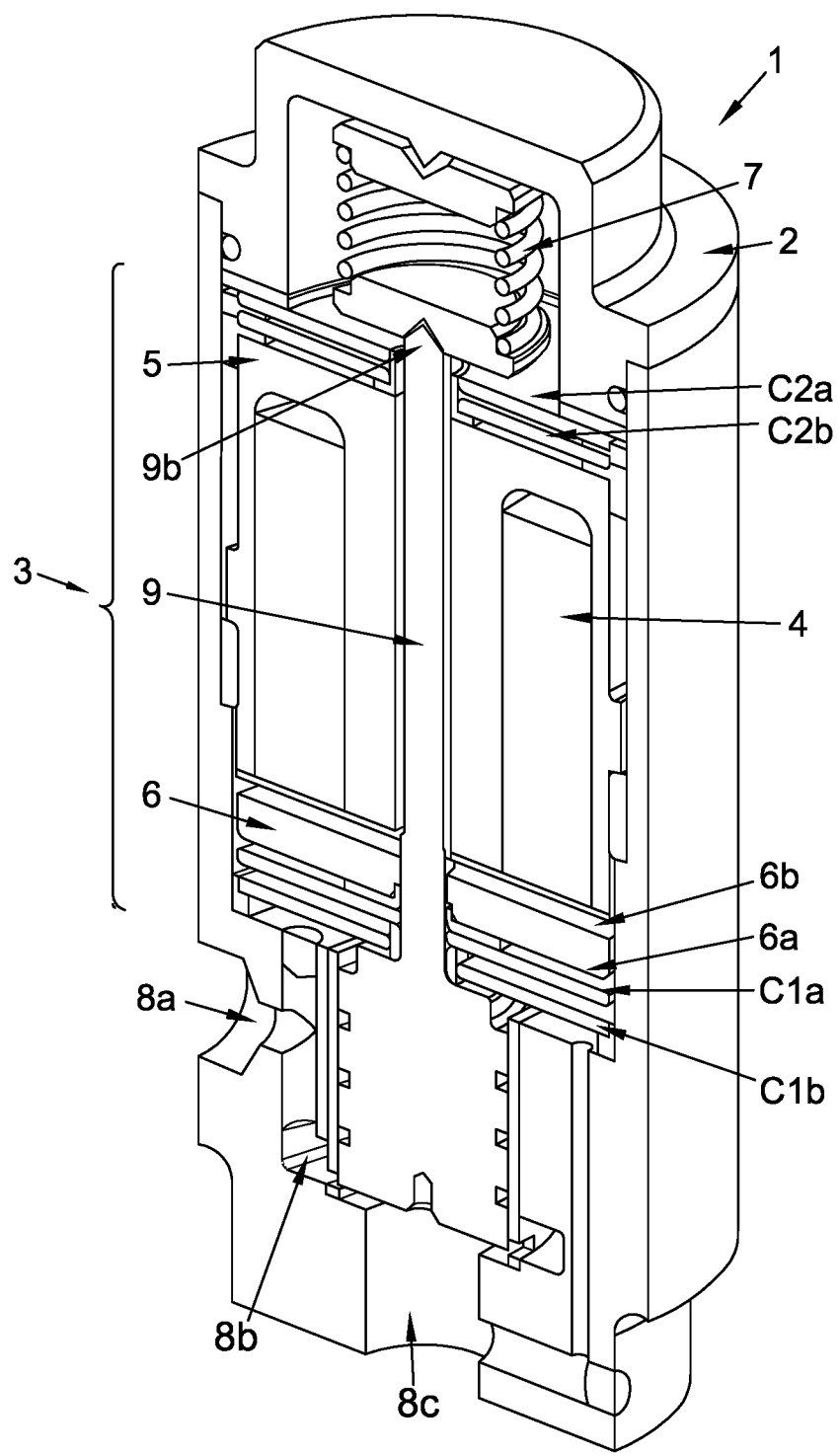
FIG. 4A illustrates a perspective axial section of an exemplary valve according to a second embodiment of the present disclosure.
Figure 4B:
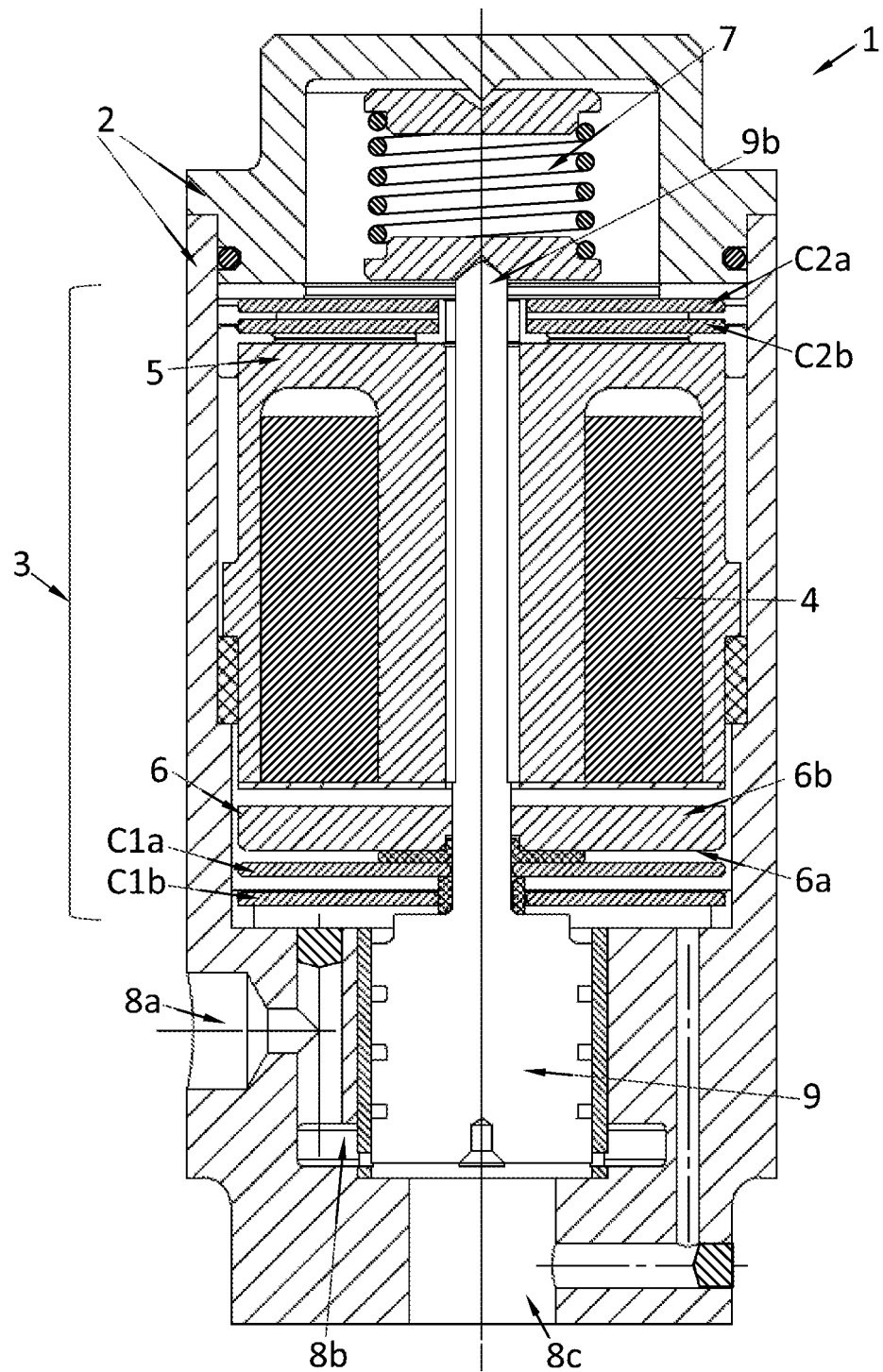
FIG. 4B illustrates an axial section of the valve of FIG. 4A from a different angle.

As shown in FIG. 3, the armature 6 may be located at least partially within, i.e. surrounded by, the coil 4. However it is also envisaged that the armature 6 may be located at one end beyond the coil 4 (but within a significant part of the electromagnetic field of the coil, for example, it may have a disc shape as shown in FIGS. 4A, 4B. In this second embodiment, the armature 6 may be located within the valve body 2 but external to the solenoid coil 4.

The valve body 2 can also house a capacitor C2, both plates C2a, C2b of which are mounted in a fixed location relative to the valve body 2 and solenoid core 5. The capacitor C2 can be considered a reference capacitor, since the distance between the plates C2a, C2b is essentially fixed, the plate spacing being subject only to thermal and other environmental conditions such as ambient pressure, and conditions within the valve body 2, e.g., the dielectric properties of a medium present between the plates C2a, C2b.

The valve body 2 can further house a variable capacitor C1. Of the capacitor plates C1a, C1b of the variable capacitor C1, the first variable capacitor plate C1a can be mounted for movement with the armature 6, e.g., by being fixed towards a first end 6a thereof. The first variable capacitor plate C1a can be integrated with the armature 6. The second variable capacitor plate C1a can be mounted fixedly with respect to the valve body 2 and the core 5. Accordingly, relative movement between the armature 6 and the core 5 can create relative displacement between the capacitor plates C1a, C1b such that the capacitance of the variable capacitor C1 changes.

As shown in FIG. 3, at a second end 6b of the armature 6 opposite to the first capacitor plate C1a, there can be disposed a return spring 7, the purpose of which will be described below.

The valve 1 can be a fuel metering valve. For example, it can have a fluid inlet 8a, a metering slot 8b and a fluid outlet 8c which define a fluid flow path 8 for fuel. The fluid flow path 8 can be arranged at an axial end of the solenoid 3 proximate to the first end 6a of the armature 6, further from the second end 6b of the armature than the variable capacitor C1.

Metering spool 9 can be disposed between the variable capacitor and the fluid outlet 8c, attached fixedly to the first end 6a of the armature. Translation of the armature 6 relative to the core 5 of the solenoid 3 can thus cause movement of the metering spool 9 with respect to the flow path 8, to meter the fluid, e.g., fuel, by blocking or opening up the flow path 8 within the metering slot 8b to greater or lesser extents.

When a current is passed through the coil 4 of the solenoid 3, the armature 6 can be forced to move in a direction which opens up the fluid flow path 8, i.e. towards an axial end of the valve closer to the second end 6b of the armature (upwards in the figure). This can cause the metering spool 9 to be drawn away from the outlet 8c, moving the metering spool 9 through the metering slot 8b of the fluid flow path 8, allowing fluid to flow from the inlet 8a via the metering slot 8b to the outlet 8c. A portion of the surface of the metering spool 9 therefore forms a displaceable wall of the fluid flow path 8 which is moved within the valve to meter the fluid.

The return spring 7 can be arranged to oppose this opening motion, pushing the armature in a direction towards an axial end of the valve 1 which is proximate the fluid flow path 8 (downwards in the figure), thereby endeavouring to block the fluid flow path 8. Accordingly, when no current passes through the coil 4 of the solenoid 3, the armature 6 can be biased by the return spring 7 to push the metering spool 9 towards the fluid outlet 8c with a preload to block the fluid flow path 8.

As can be seen, the return spring 7 may be provided within the solenoid 3 as shown in the first embodiment of FIG. 3. An alternative embodiment is shown in FIGS. 4A and 4B, where the return spring 7 is shown as being provided outside of the solenoid, above the reference capacitor C2. The armature disc 6 is fixed for movement with the member providing the metering spool 9, one end of which 9b is operably in contact with the return spring or a plate receiving thrust from the return spring 7.

The return spring 7 provides a linear relationship of force to displacement, such that each unit of displacement of the armature causes a corresponding unit of compression in the return spring 7 which in turn generates a corresponding unit of spring reaction force that urges the armature 6 and the metering spool 9 to return to its rest position where the metering spool 9 closes off the fluid flow path 8. The return spring 7 may apply a pre-load to the metering spool 9 that has to be overcome in order to open the valve. In this way it can ensure sealing when the fluid flow path 8 is closed.

In the case of a power failure, no current is supplied to the coil 4 of the solenoid 3 and consequently, the return spring 7 can cause the armature 6 and the metering spool 9 to translate to close the fluid flow path 8. Thus the return spring 7 can provide a mechanism whereby power losses will result in prevention of fuel flow.

Although in the examples shown in FIGS. 3 and 4A-4B, the distance between the variable capacitor plates C1a, C1b increases as the fluid flow path 8 is unblocked, it is envisaged that the armature 6 may be connected to, or integrated with the variable capacitor C1 such that the distance between the variable capacitor plates C1a, C1b decreases as the fluid flow path 8 is unblocked, and increases as the fluid flow path 8 is increasingly blocked. In this arrangement an inverse of the feedback function (to be explained further below) may need to be applied.

Figure 1:
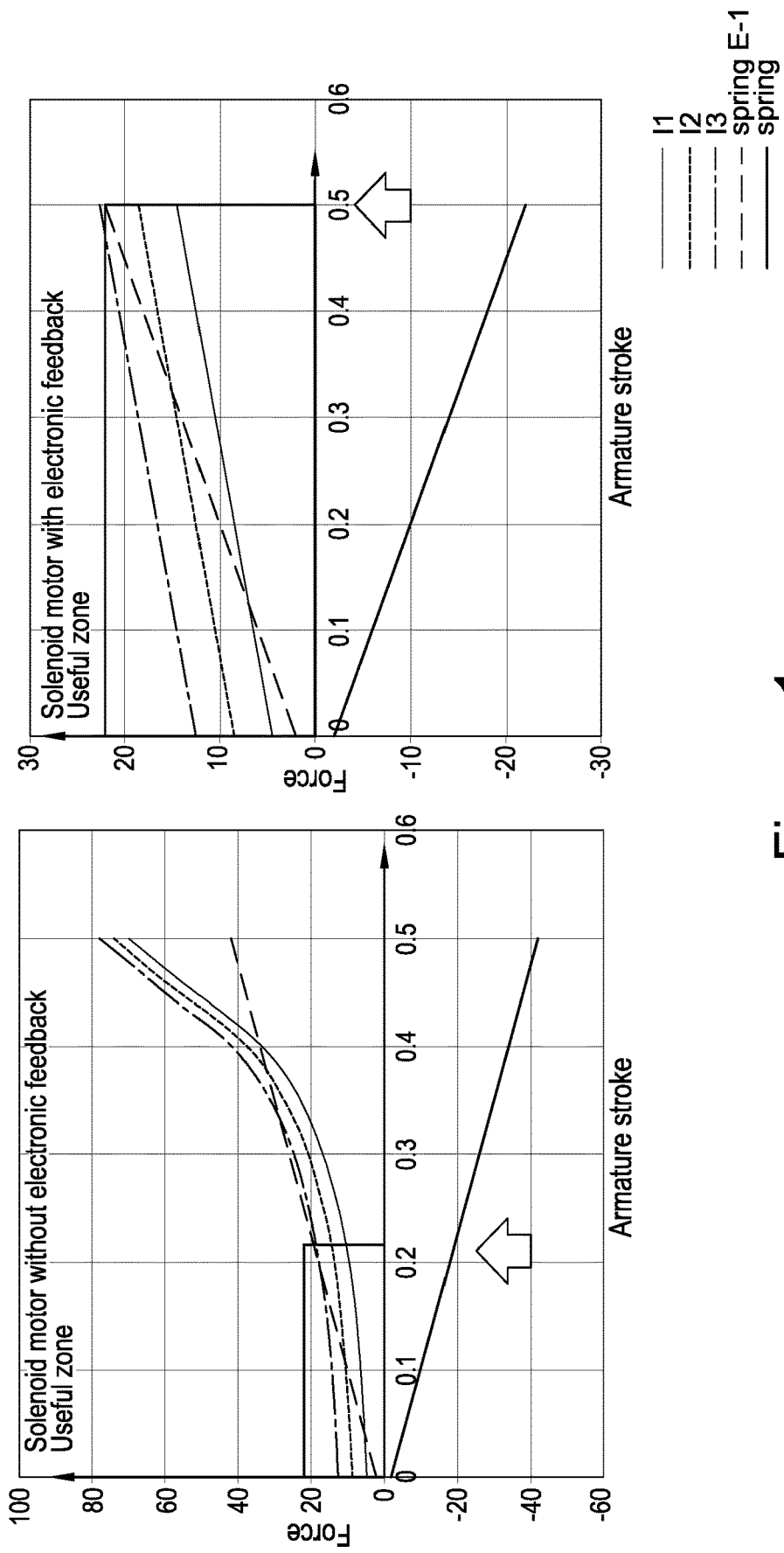
FIG. 1 illustrates exemplary current-displacement characteristics for a valve without electronic feedback and for a valve with electronic feedback.

With reference to FIG. 1, it can be seen that by varying the input current to the coil 4 of the solenoid 3, the metering spool 9 can be moved to a selected position relative to the metering slot 8b. In this way it can open the metering slot 8b by a predetermined amount to meter the fluid, by moving the metering spool 9 away from blocking metering slot 8b.

The displacements of the metering spool 9 could be predetermined based on an input current to solenoid force or displacement characteristic. While a degree of linearity is retained during initial stages of the armature movement, this linearity soon fades in such known metering valves to follow the steeper path of the curves shown. For this reason, in conventional metering valves, only a small region of the armature movement is used for metering fluids (the useful zone is illustrated schematically in the figure by the box enclosing the linear response portions).

FIG. 1 shows graphs of solenoid force (which is proportional to solenoid current) on the y-axis against armature stroke on the x-axis for three levels of current, I1, I2 and I3. The graph on the left-hand side of the figure is for a metering valve having no electronic feedback; the graph on the right-hand side is for a metering valve with electronic feedback. Below the x-axis in the graphs are plots showing the biasing force applied by the return spring 7, which exhibit a linear force-to-displacement relationship. The plot for the return spring 7 is reflected above the x-axis to show the linearity of curves I1, I2 and I3 with respect to the returning spring force for at least an initial stage of the armature movement.

In the case of an example of a convention solenoid shown on the left-hand side of FIG. 1, the solenoid holds the linearity for just over 0.2 mm. With an electronic feedback it may be possible to widen the region of linearity to over twice the displacement without. In the example of a fuel metering valve shown, linearity may be held for 0.4 mm or more, even 0.5 mm or more than 1 mm. Linearity may be achieved for the whole permitted stroke of the valve 1, e.g., the stroke being limited by the mechanical interaction of components, e.g., the constraints of the armature or the construction of the variable capacitor, rather than the non-linearity of the response characteristics.

Figure 2A:
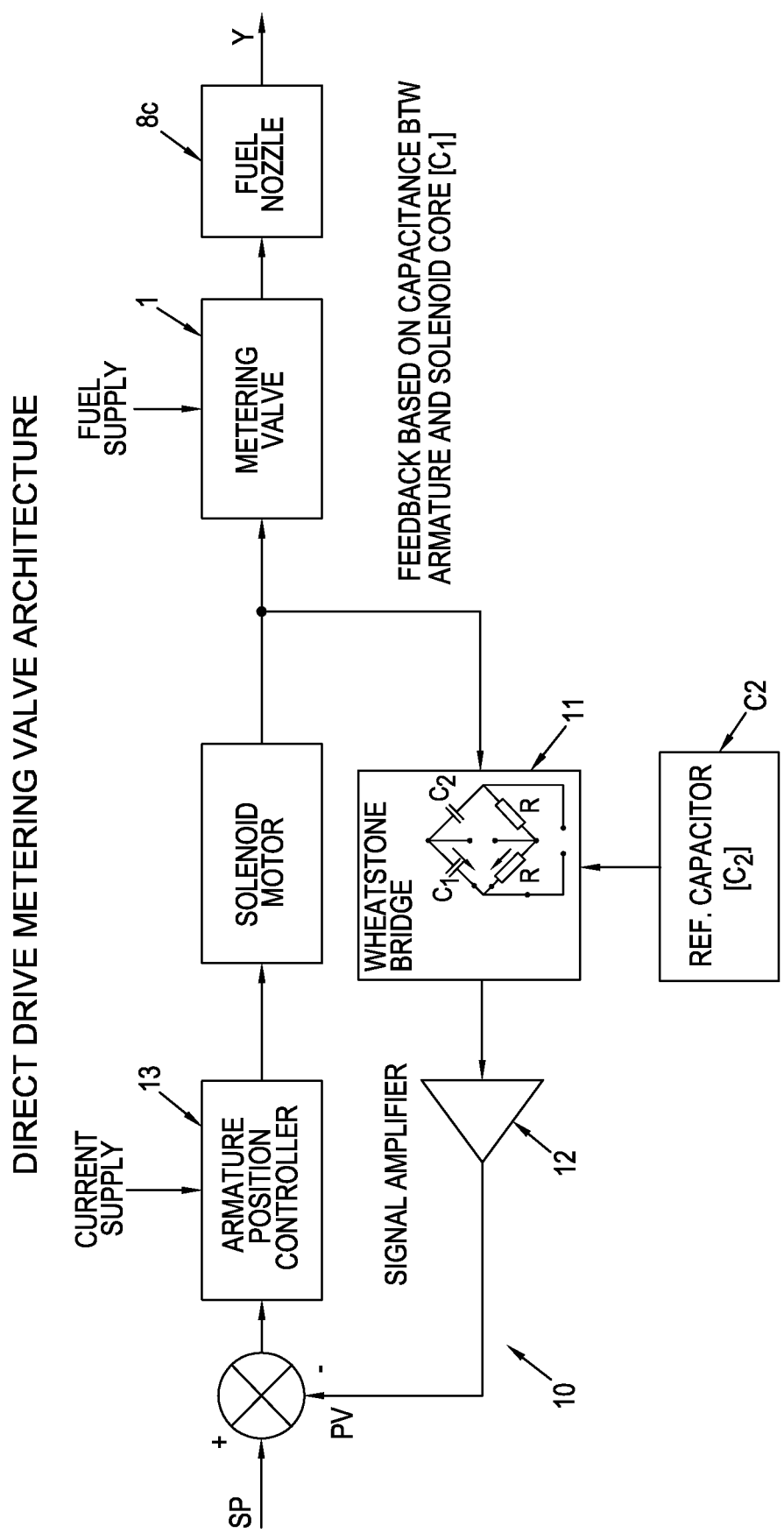
FIG. 2A illustrates schematically an exemplary electronic feedback loop according to a first configuration.

With reference to the exemplary arrangement illustrated in FIG. 2A, a feedback loop 10 can be connected to the valve 1. The feedback loop 10 can be internal or external to the valve 1. It can take as input measurements a capacitance value derived from the variable capacitor C2, e.g. with reference to a baseline capacitance. In particular it can take as input measurements capacitance values from the reference and variable capacitors C2, C1. These two capacitance values can be compared to determine a difference between the capacitances, in particular a ratio of the capacitances. This may be achieved using a Wheatstone Bridge 11 arrangement. However other ways of comparing the capacitances could also be used.

The capacitors C2 and C1 can be substantially identical apart from their plate separations and fixings to the structure of the metering valve. The plates C1a, C1b, C2a, C2b can be of equal area, can be made from identical materials, can comprise identical materials between the plates (e.g., vacuum, air, inert gas, fuel, or other insulative substance), and can have comparable plate spacings at rest. In this way, they can have the same coefficients of expansion in response to temperature. Where there may be slight differences in diameter (outer and/or inner) to accommodate location of the plates C1a, C1b, C2a, C2b with respect to other components, one or more of the plates C1a, C1b, C2a, C2b may include a hole 20 (see FIG. 3) to adjust its surface area to calibrate the surface areas and assist the pseudo-linear characteristics. Such holes 20 may also allow the passage of wires to the solenoid or the other of the capacitors to provide electrical connections.

Moreover the capacitors C1, C2 can both be enclosed within the same housing of valve body 2 so that they can experience the same ambient conditions. The capacitors C2, C1 can also be mounted at opposite ends of the core 5 so that not only are they subject to the same ambient conditions external to the valve body 2, they can also be subjected to similar amounts of heat generated by the coil, i.e. share the same internal conditions too.

The difference in capacitance of variable capacitor C1 compared to reference capacitor C2, e.g., a ratio of C1 to C2, can therefore provide a measure of the armature displacement within the core 5. Through the provision of the reference capacitor C2, this value can be corrected automatically for temperature and any other external or internal influence.

Arrangements are envisaged where the variable capacitor C1 and the reference capacitor C2 are arranged the other way round with respect to the core 5 and the armature 6. Arrangements are also envisaged where the movable plate of the variable capacitor C1 is not directly attached to the armature 6 but is movable with it. For example, it could be attached to a component fixed to the armature 6 so that it moves with it.

Arrangements are also envisaged where the capacitor plates have a different profile from that shown, i.e. they are not circular, for example, where the valve body 2 and core 5 have a non-circular cross-section (e.g. rectangular, oval or polygonal cross-section) or are not planar.

The capacitor plates of the variable or reference capacitor C1, C2 can have a ring shape form to allow components to pass through. Additionally or alternatively, as described above, the capacitor plates can have portions removed therefrom to allow passage of wires and/or to ensure that both capacitors C1, C2 have the same surface area.

The ratio of the capacitance of capacitor C1 compared to reference capacitor C2 can then be amplified using a signal amplifier 12. It can also be compared with the input signal to the solenoid 3, in order to produce a correction signal. This correction signal can then be used to correct a controller 13 which controls the position of the armature 6 of the solenoid.

Through the capacitance comparison, the controller 13, 121 (see FIGS. 2A, 2B) is able to determine accurate positional information about the armature 6 of the solenoid 3. Accordingly, the controller can adjust the current supplied to the solenoid 3 based on the feedback loop to achieve a more precise and adjustable displacement. In turn, more precise and more adjustable metering of the fluid can be achieved.

The described system, through the provision of the reference capacitor C2, can also take account of fluctuations in ambient conditions, such as changes in temperature, automatically. This can be particularly beneficial for aircraft where the operating temperature range of a fuel metering valve can be many tens of degrees.

Figure 2B:
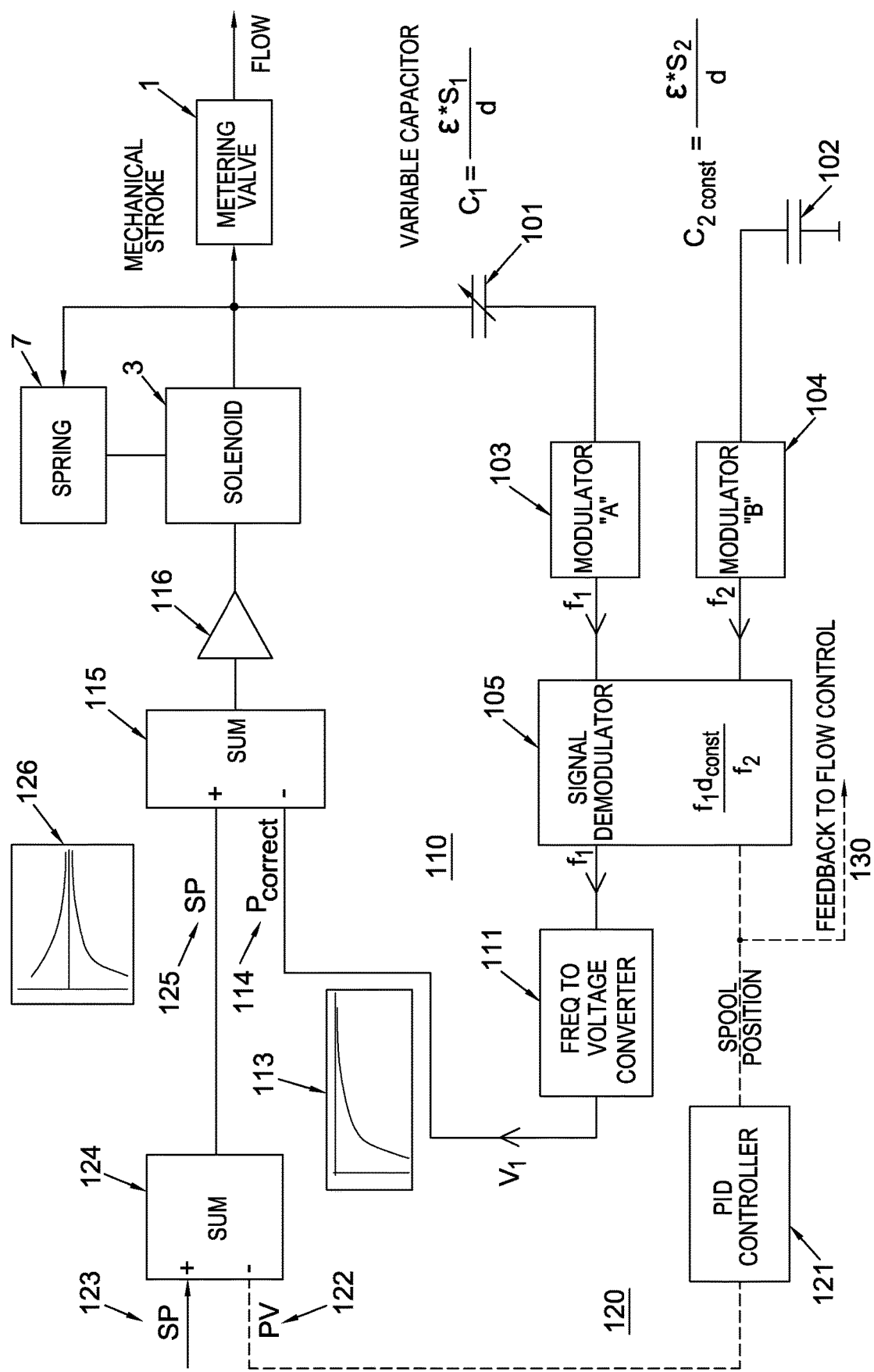
FIG. 2B illustrates schematically an exemplary electronic feedback loop according to a second configuration.

With reference to FIG. 2B there is shown a more detailed control loop 100 as may be used for the valve of the present disclosure. As can be seen on the right hand side of the Figure, the metering valve 1 is connected to variable capacitor C1, shown by reference number 101, in the manner described above, such that movement of the armature 6 of the valve 1 causes the capacitance of the variable capacitor C1 to vary. The capacitance of the capacitor C1 is given by Equation (1):

$$C_1 = \frac{\varepsilon \times S_1}{d_1} \quad (1)$$

where:
$\varepsilon$ is the electrical permittivity of the dielectric between the capacitor plates;
$S_1$ is the surface area of the capacitor plates; and
$d_1$ is the distance between the capacitor plates.

Variable capacitor C1 is connected to a modulator "A" 103 which generates a frequency $f_1$ based on the capacitance of variable capacitor C1, according to Equation (2):

$$f_1 = \frac{1}{2\ln(2) \times C_1 \times R} \quad (2)$$

where:
$f_1$ is the frequency generated by modulator 103;
$C_1$ is the measured capacitance of capacitor C1; and
R is a calibrated resistance in the digital signal modulator circuit.

The fixed capacitor C2, which has been given the reference number 102 as shown in FIG. 2B, has a fixed constant capacitance. The capacitance of the capacitor C2 is given by Equation (3):

$$C_2 = \frac{\varepsilon \times S_2}{d_2} \quad (3)$$

where:
$\varepsilon$ is the electrical permittivity of the dielectric between the capacitor plates;
$S_2$ is the surface area of the capacitor plates; and
$d_2$ is the distance between the capacitor plates.

Since both capacitors are subject to the same conditions inside the valve, the electrical permittivity $\varepsilon$ is the same for both capacitors. Similarly, a fact which will be used in Equation 6 below is that both capacitors can be arranged to have the same surface area as each other, such that $S_1=S_2$.

Variable capacitor C2 is connected to a modulator "B" 104 which generates a frequency $f_2$ based on the capacitance of variable capacitor C2, according to Equation (4):

$$f_2 = \frac{1}{2\ln(2) \times C_2 \times R} \quad (4)$$

where:

f2 is the frequency generated by modulator 104;

C2 is the measured capacitance of capacitor C2; and

R is a calibrated resistance in the digital signal modulator circuit.

Both modulators 103, 104 are arranged to send the respective frequency signals $f_1$, $f_2$ to a combined signal demodulator and comparator 105. The comparator 105 is arranged to compare the frequencies $f_1$, $f_2$ using a ratio as shown in Equation (5).

$$\frac{f_1 \times d_2}{f_2} \quad (5)$$

This ratio is equivalent to the distance between the plates of the variable capacitor, as shown in Equation 6 which substitutes the above mentioned facts and Equations 1-4 into Equation 5.

$$\frac{f_1 \times d_2}{f_2} = \frac{2\ln(2) \times C_2 \times R \times d_2}{2\ln(2) \times C_1 \times R} = \frac{C_2 \times d_2}{C_1} = \frac{\frac{\varepsilon \times S_2}{d_2} \times d_2}{\frac{\varepsilon \times S_1}{d_1}} = d_1 \quad (6)$$

From the combined signal demodulator and capacitor, the feedback splits off into three feedback loops 110, 120 and 130. Feedback loop 130 which is a feedback for a higher assembly controller uses the signal produced by the comparator, i.e. the distance $d_1$.

Feedback loop 120 also uses the signal produced by the comparator, i.e. the distance $d_1$, which is indicative of the position of the metering spool. This signal is passed to a PID controller 121. The PID controller 121 may comprise proportional, integral or derivative control, or any combination of two or three of the types of control such that a stable feedback loop can be achieved.

The signal produced by the PID controller 121 is a process variable PV 122. The process variable PV 122 in this feedback loop 120 is the actual flow rate through the metering valve, which is proportional to the distance $d_1$ between the variable capacitor plates C1a, C1b.

The process variable PV 122 is subtracted at box 124 from a set point SP 123. In this case, the set point SP 123 is the desired flow through the metering valve, which is proportional to the position of the metering spool 9. This creates an error signal which provides a new set point SP 125. This error signal may be explained by the graph 126 shown in miniature in FIG. 2B.

For a particular current which flows through the coil of the solenoid, there is a non-linear characteristic of the solenoid actuator, or "f(1,x)". In other words, the force applied to the armature 6 varies depending on the gap between the variable capacitor plates C1a, C1b, as well as the input current. Thus, when a current is applied to the solenoid 3, the armature 6 will move against the biasing force of the return spring 7, causing the gap between the variable capacitor plates to become larger. This in turn will cause the force on the armature 6 to decrease. As the armature 6 moves further against the biasing spring 7, eventually, the forces between the return spring 7 and the solenoid armature 6 will balance and the armature 6 and the metering spool 9 will achieve a stable position.

The "mechanical spring characteristic" is a linear characteristic, since the force in the return spring 7 is proportional to the amount by which the return spring 7 has been compressed, whereas the characteristic of the solenoid actuator is non-linear.

Accordingly, it is desirable to provide a quasi-linear characteristic of the solenoid using an error-signal. This is achieved using a linearisation curve as will be described further below.

Returning to FIG. 2B, the feedback loop 110 demodulates the signal $f_1$ at box 105 and passes the demodulated frequency signal to a frequency-to-voltage converter 111. The voltage produced by the converter 111 is dependent on the frequency $f_1$, which as seen from a combination of Equations 1 and 2 above, is proportional to a distance between the plates $d_1$ of the variable capacitor C1 and thus also related linearly to the armature 6 displacement. Accordingly, voltage signal $V_1$ produced by the frequency-to-voltage converter 111 is a function of the armature displacement in the valve. This voltage is used in conjunction with a linearisation curve as shown in miniature in graph 113 of FIG. 2B.

A linearisation curve "f(x)" has a particular characteristic current against gap present between the variable capacitor plates C1a, C1b. The linearisation curve characteristic, when summed with the non-linear characteristic of the solenoid actuator, results in a quasi-linear characteristic. This summation can be described by the equation: F=f(1, x)+f(x), where f(1,x) is the non-linear characteristic of the solenoid actuator and f(x) is the linearisation curve characteristic.

Although the linearisation curve has been described as having an x-axis of the gap distance $d_1$ between the variable capacitor plates C1a, C1b, as described above, the gap distance is proportional to the frequency $f_1$ generated by modulator 103 and thus also to the voltage signal $V_1$ produced by the frequency-to-voltage converter 111. Accordingly, the linearisation curve can be equally described as a function of the voltage signal $V_1$.

Thus for a given $V_1$, the amount by which the current should be reduced to achieve the quasi-linear characteristic of the solenoid can be calculated by finding the correct point on the linearisation curve. This (negative) current to correct the error signal, shown as $P_{correct}$ 114 in FIG. 2B is summed with the error signal SP 125 at box 115. Once this quasi-linear characteristic has been achieved at box 115, the signal as a modified current is amplified at amplifier 116 and the modified and amplified current is sent to the solenoid 3, which causes the armature 6 to move against the bias of the return spring 7 in a quasi-linear manner of force to displacement of the armature based on a given input current.

Accordingly, a stable flow through the flow path 8 of the valve can be achieved.

The above-described system and arrangement can be beneficial in that by using the internal feedback loop 10, together with the controller 13, the position of the armature 6 and thus the position of the metering spool 9 can be both precisely known and precisely controlled over greater armature displacements, in spite of the non-linear current-force characteristics shown in FIG. 1.

The use of the feedback loop 10 can allow the characteristic to be pseudo-linear, in the sense that the force of the solenoid or the positional output appears linearly related to an input current, such that a greater extent of the armature stroke can be usefully used. Accordingly, the metering valve 1 can be more precisely and adjustably opened and closed to a greater extent than found with known valves. Single stage valve fuel metering for individual injectors becomes possible, offering further fuel savings.

The design of valves in accordance with the present disclosure offers an adjustable but stable continuous flow of fluid through the metering slot of the valve.

Additionally, the electronic feedback can provide data for auto-diagnostics of the valve. For example, the feedback signal can be used to raise an alert if the measured armature position along its stroke is not in accordance with the position anticipated by the system, e.g. if solids are blocking the metering flow path 8 such that the armature 6 is unable to move to close the fluid flow path 8.

No components apart from the two capacitors C1, C2 are needed within the valve to provide a measurement of the armature 6 positioning. The variable capacitor C1 can be fixed to the core 5 and the armature 6 without any need for further components. Accordingly, the resulting arrangement is very simple.

Since the gap between the armature 6 and the solenoid 3, in use, is filled with fuel and since the fuel will be subject to temperature variation, the reference capacitor C2 is located in the valve body so that it experiences the same environmental conditions both internally and externally as the variable capacitor C1. Both capacitors C1, C2 may have the same surface area and the same coefficient of thermal expansion. Accordingly, the reference capacitor C2 and the variable capacitor C1 are subject to the same external influences and so any external factors can be negated by comparing these two capacitances, e.g., with the use of a Wheatstone Bridge arrangement 11.

The feedback provides the advantage of allowing a modified current to be passed to the coil 4, as a function of both the input control signal and the actual known position of the armature 6. Thus, more adjustable positioning of the armature 6 is possible, more of the armature stroke can be usefully used, the accuracy with which fuel can be metered can be increased and the repeatability of the positioning of the metering spool 9 is ensured.

In particular, the feedback signal is proportional to armature position and thus also to the amount by which the flow path 8 is open and therefore to the flow rate. Accordingly, the feedback signal when used in a system control loop can increase the fluid (or fuel) dosing adjustability.

Moreover, since a greater percentage of the stroke can be usefully used, the metering valves could be downsized since a smaller valve would continue to operate in a pseudo-linear fashion but still be able to provide the same length of useful stroke. Accordingly, weight and size of the valves and the electromagnets disposed therein could be reduced.

Thus, in at least the described exemplary embodiments, there has been described a valve which could be used on aircraft, in order to improve jet engine performance and reduce emissions of NOx pollution. It may further improve malfunction diagnosis and simplify the architecture of the entire fuel system. More accurate and adjustable metering of fuel may be achieved through the pseudo-linear characteristic of the force generated by the solenoid 3 as a function of armature stroke, which is automatically corrected for temperature.

Further aspects of the present disclosure will now be described according to the following embodiments:

Embodiment 1

A valve includes a solenoid having: a coil mounted on a core; and an armature, the armature being moveable axially with respect to the core. The valve also includes: a variable capacitor having a first plate mounted for movement with the armature and a second plate fixed with respect to the core; a reference capacitor having third and fourth plates at a set separation; and a valve body which houses the solenoid, the variable capacitor and the reference capacitor.

Embodiment 2

The valve as described in embodiment 1, further comprising: a controller for controlling the movement of the armature; and an electronic feedback loop.

Embodiment 3

The valve as described in embodiment 2, wherein the electronic feedback loop is configured to: determine a difference in the capacitances of the variable and reference capacitors; use the difference to determine a value corresponding to a displacement of the armature; and send the value to the controller. In this way it may provide the valve with a pseudo-linear current-displacement characteristic.

Embodiment 4

The valve as described in any prior embodiment, wherein the electronic feedback loop is internal to the valve.

Embodiment 5

The valve as described in any prior embodiment, wherein the valve is a fuel metering valve, further comprising: a fuel inlet; a fuel outlet; a fuel flow path from the inlet to the fuel outlet comprising a metering slot; and a metering spool configured to meter the flow of fuel in the fuel flow path at the metering slot.

Embodiment 6

The valve as described in any prior embodiment wherein the valve is a single stage fuel metering valve for an injector of a gas turbine engine.

Embodiment 7

A gas turbine engine comprising a valve as described in any preceding embodiment.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A metering valve comprising:
a solenoid having:
a coil mounted on a core; and
an armature moveable axially with respect to the core and against a return bias in response to a current in the coil;
a variable capacitor having a first plate mounted for movement with the armature and a second plate fixed with respect to the core;
an electronic feedback loop which is used to variably adjust a magnitude of the current in the coil based on a variable feedback signal derived from the capacitance of the variable capacitor between the open and closed positions of the variable capacitor;
a reference capacitor having third and fourth plates at a set separation; and
a valve body which houses the solenoid, the variable capacitor and the reference capacitor,
wherein the electronic feedback loop is configured to:
observe a ratio of the capacitances of the variable and reference capacitors; and
use the ratio of the capacitances to produce a feedback signal corresponding to a displacement of the armature, and
wherein the feedback signal is used to adjust the current to provide the metering valve with a linear solenoid current-armature displacement characteristic for a full range of movement of the metering valve, where a separation of the first and second plates of the variable capacitor is at a maximum when the valve is in a fully open position and at a minimum when the valve is in a fully closed position.

2. The metering valve as claimed in claim 1, further comprising a controller for controlling the current in the coil and the movement of the armature, the controller being responsive to the feedback signal to adjust the current in the coil.

3. The metering valve as claimed claim 1, further comprising a valve body and wherein the electronic feedback loop is housed within the valve body.

4. The metering valve as claimed in claim 1, further comprising:
a fluid inlet;
a fluid outlet;
a fluid flow path from the fluid inlet to the fluid outlet comprising a metering slot; and
a metering spool configured to meter the flow of fluid in the fluid flow path at the metering slot,
and wherein the metering valve is for metering fuel;
and wherein the metering spool is fixed for movement with the armature to meter the fluid and the valve comprises a return spring biasing the armature and the metering spool towards a closed configuration.

5. The metering valve as claimed in claim 1, wherein the valve is a single stage fuel metering valve for an injector for gas turbine engine.

6. The metering valve as claimed in claim 5, further comprising a valve body and wherein the electronic feedback loop is housed within the valve body.

7. The metering valve as claimed claim 1, wherein the valve further comprises a diagnostic system internal to the metering valve, configured to provide system diagnostics based on the measured capacitance; and
wherein the variable capacitor is a differential variable capacitor.

* * * * *